(12) United States Patent
Cardno

(10) Patent No.: US 9,906,900 B2
(45) Date of Patent: Feb. 27, 2018

(54) LOCATION SERVICES IN AN OBFUSCATED WIRELESS NETWORK

(71) Applicant: New BIS Safe Luxco S.à r.l, Luxembourg (LU)

(72) Inventor: Andrew John Cardno, San Diego, CA (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 83 days.

(21) Appl. No.: 14/910,131

(22) PCT Filed: Aug. 4, 2014

(86) PCT No.: PCT/NZ2014/000157
§ 371 (c)(1),
(2) Date: Feb. 4, 2016

(87) PCT Pub. No.: WO2015/020534
PCT Pub. Date: Feb. 12, 2015

(65) Prior Publication Data
US 2016/0302033 A1     Oct. 13, 2016

Related U.S. Application Data

(60) Provisional application No. 61/862,261, filed on Aug. 5, 2013.

(51) Int. Cl.
*H04L 29/06* (2006.01)
*H04W 4/02* (2018.01)
(Continued)

(52) U.S. Cl.
CPC .......... *H04W 4/02* (2013.01); *H04L 61/6022* (2013.01); *H04L 67/303* (2013.01); *H04W 4/003* (2013.01);
(Continued)

(58) Field of Classification Search
CPC ..... H04W 4/02; H04W 40/244; H04W 4/003; H04W 88/02; H04W 84/12; H04W 88/08; H04L 67/303; H04L 61/6022
(Continued)

(56) References Cited

U.S. PATENT DOCUMENTS 8,255,393 B1 *  8/2012  Yu .................... H04L 63/1441
                                                    707/724
8,494,549 B1 *  7/2013  Pillai ................. H04W 64/00
                                                    455/403

(Continued)

FOREIGN PATENT DOCUMENTS

EP     1 850 606 A1    10/2007

OTHER PUBLICATIONS

International Search Report for International Application No. PCT/NZ2014/000157 dated Oct. 12, 2014 (2 pages).

*Primary Examiner* — Shahriar Behnamian
(74) *Attorney, Agent, or Firm* — Merchant & Gould P.C.

(57) ABSTRACT

An apparatus and method for providing location information within a wireless network operable to obfuscate location information is described. The apparatus and method comprising a processor and memory coupled to the processor capable of storing data. The processor is configured to: store network profile data on a plurality of wireless network access points within the network. The network profile data including an identifier for the network access point, signal information, the physical location of the network access point, and the time. The processor is also configured to receive a request for location information from a client application executing on a mobile device, the request including information on the wireless network access points the mobile wireless device has been in communication with, information on the received signal and the time of the communication. The processor then determines the location (Continued)

of the mobile wireless device using the request data and the network profile data; and sends the location to the client application.

20 Claims, 4 Drawing Sheets

(51) Int. Cl.
    *H04L 29/12*     (2006.01)
    *H04L 29/08*     (2006.01)
    *H04W 4/00*     (2018.01)
    *H04W 40/24*     (2009.01)
    *H04W 84/12*     (2009.01)
    *H04W 88/02*     (2009.01)
    *H04W 88/08*     (2009.01)

(52) U.S. Cl.
    CPC .......... *H04W 40/244* (2013.01); *H04W 84/12* (2013.01); *H04W 88/02* (2013.01); *H04W 88/08* (2013.01)

(58) Field of Classification Search
    USPC ..................................... 455/456.1–456.6, 457
    See application file for complete search history.

(56) References Cited

U.S. PATENT DOCUMENTS

| | | | | |
|---|---|---|---|---|
| 2008/0244707 | A1* | 10/2008 | Bowser | H04L 63/1441 726/4 |
| 2010/0146583 | A1* | 6/2010 | Prehofer | G06Q 30/02 726/1 |
| 2012/0100870 | A1* | 4/2012 | Prost | G01S 5/02 455/456.1 |
| 2012/0157115 | A1 | 6/2012 | Jeong | |
| 2012/0322458 | A1* | 12/2012 | Shklarski | H04W 12/02 455/456.1 |
| 2013/0190018 | A1* | 7/2013 | Mathews | H04W 4/023 455/456.6 |

* cited by examiner

LOCATION SERVICES IN AN OBFUSCATED WIRELESS NETWORK

This application is a National Stage Application of PCT/NZ2014/000157, filed 4 Aug. 2014, which claims benefit of U.S. Ser. No. 61/862,261, filed 5 Aug. 2013 and which applications are incorporated herein by reference. To the extent appropriate, a claim of priority is made to each of the above disclosed applications.

FIELD OF THE INVENTION

The present invention relates to location services in a wireless network. In particular, the present invention relates to location services in an obfuscated wireless network.

BACKGROUND

Online information providers that provide information services to smart phone and other mobile/portable wireless device users are increasingly using location information based on the wireless network the smart phone or mobile wireless device is connected to.

Various methods exist to obfuscate the location of a wireless device within a wireless network, but the obfuscation also means that the provider of the wireless network cannot identify the physical location of the device and thus cannot provide their own information services based on the physical location of the mobile wireless device.

It would be desirable to provide a way for a wireless network provider to obfuscation the network information that information service providers use to obtain location information, while still being able to obtain and use the location information to provide location based information services themselves.

An object of the present invention is to provide location based services in an obfuscated wireless network.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

According to one aspect, the present invention provides location services in an obfuscated wireless network.

According to a further aspect, the present invention is an apparatus for providing location information within a wireless network, the wireless network having a plurality of wireless network access points, the wireless network operable to obfuscate location information, the apparatus comprising a processor and memory coupled to the processor capable of storing data, wherein the processor is configured to: store network profile data on a plurality of wireless network access points within the network, the network profile data including: an identifier for the network access point; signal information; the physical location of the network access point; and the time; receive a request for location information from a client application executing on a mobile device, the request including: information on the wireless network access points the mobile wireless device has been in communication with; information on the received signal; and the time of the communication; determine the location of the mobile wireless device using the request data and the network profile data; and send the location to the client application.

According to a further aspect, the present invention is a method for providing location information on the physical location of a mobile wireless device within a wireless network, the wireless network having a plurality of wireless network access points, the wireless network operable to obfuscate location information, the method comprising: storing network profile data on a plurality of wireless network access points within the network, the profile data including: an identifier for the network access point; signal information; the physical location of the network access point; and the time; receiving a request for location information from a client application executing on a mobile device, the request including: information on wireless network access points the mobile wireless device has been in communication with; information on the received signal; and the time of the communication; determining the location of the mobile wireless device using the request data and the network profile data; and sending the location to the client application.

According to a further aspect, the present invention is a mobile device, comprising: a processor; and a memory coupled to the processor and capable of storing data, wherein the processor is configured to: store network profile data on a plurality of wireless network access points within the network that the mobile wireless device has been in communication with, the network profile data for each wireless network access point including: an identifier for the network access point; signal profile information; and the time the mobile wireless device was in communication with the network access point; request from a server, wireless network access point information, data provided with the request including: a mobile wireless device identifier; and for each wireless network access point information is requested on: an identifier for the network access point; and the time or times the mobile wireless device was in communication with the network access point; receive from the server, wireless network access point information, the wireless network access point information including: an identifier for the network access point, the time or times the mobile wireless device was in communication with the network access point; and for each time, signal information and location information; and determine the location of the mobile wireless device using the request data and the received wireless network access point information.

According to a further aspect, the present invention is a method of calculating the location of a mobile wireless device within a wireless network, the wireless network operable to obfuscate location information, the method comprising: storing network profile data on a plurality of wireless network access points within the network that the mobile wireless device has been in communication with, the network profile data for each wireless network access point including: an identifier for the network access point; signal profile information; and the time the mobile wireless device was in communication with the network access point; requesting from a server, wireless network access point information, data provided with the request including; a mobile wireless device identifier; and for each wireless network access point information is requested on: an identifier for the network access point; and the time or times the mobile wireless device was in communication with the network access point; receiving from the server wireless network access point information, the wireless network access point information including: an identifier for the network access point, the time or times the mobile wireless device was in communication with the network access point; and for each time, signal information and location information; and determining the location of the mobile wireless device using the request data and the received wireless network access point information.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
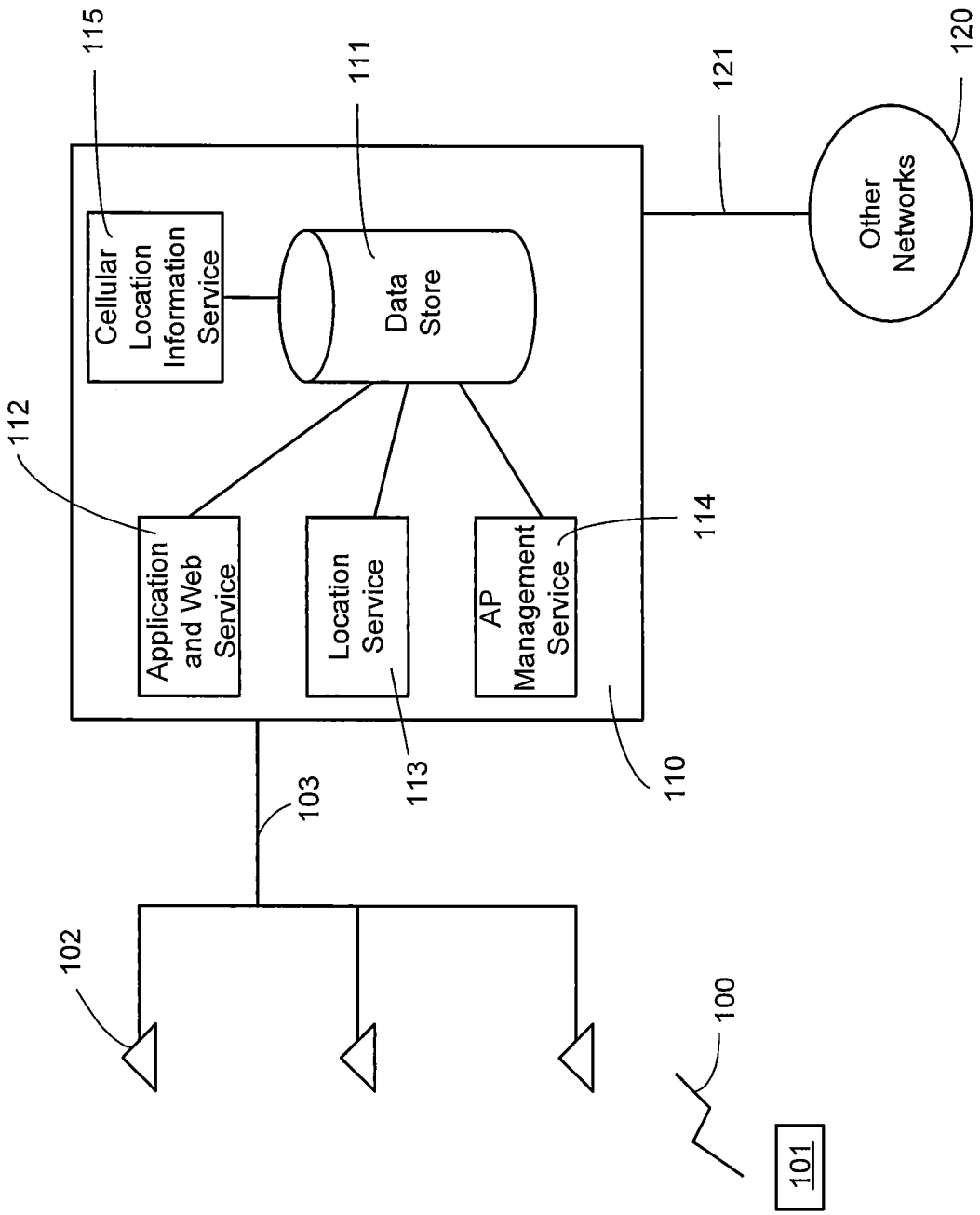
FIG. 1 shows a conceptual system diagram according to an embodiment of the present invention.

Embodiments of the present invention are described herein with reference to an adapted wireless network and location service.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard, operating buttons or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

It will be understood that the system herein described includes one or more elements that are arranged to perform the various functions and methods. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed.

It will be understood that the arrangement and construction of the modules, systems, devices or engines may be adapted accordingly depending on system and user requirements so that various functions may be performed by different modules, systems, devices or engines to those described herein, and that certain modules, systems, devices or engines may be combined into single modules, systems, devices or engines.

It will be understood that the modules, systems, devices or engines described may be implemented and provided with instructions using any suitable form of technology. For example, the modules, systems, devices or engines may be implemented or created using any suitable software code written in any suitable language, where the code is then compiled to produce an executable program that may be run on any suitable computing system. Alternatively, or in conjunction with the executable program, the modules, systems, devices or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific network device.

Figure 2:
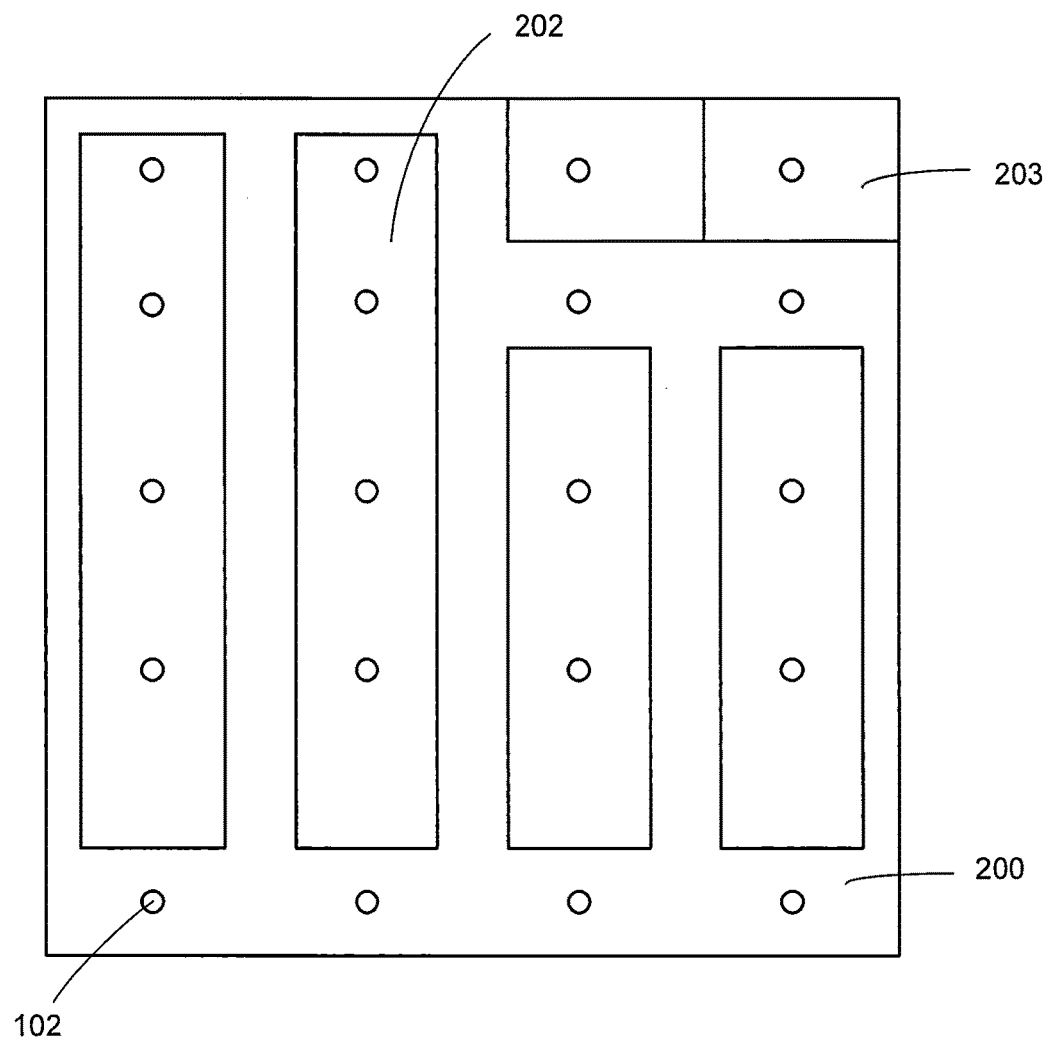
FIG. 2 shows a plan of a wireless network in part of a physical space such as a store.

Referring to FIG. 1 a mobile wireless device 101 is wirelessly connected using a wireless network 100. The mobile wireless device 101 may be a smart phone or another portable wireless device. The wireless network 100 has a number of wireless network access points 102. Referring also to FIG. 2 the wireless network access points (AP) 102 are distributed in a defined space 200 to provide network access to the mobile wireless device 101.

In practice there will be more than one mobile wireless device 101 connected to the wireless network 100.

The wireless network access points 102 are connected over a network 103 which may be a wired or wireless network to a system controller 110. The system controller 110 is shown in one block but the components of the system controller 110 may be a single device or a number of interconnected separate devices.

The system controller 110 contains a location service provider 113 to provide location services for the network 100. The system controller 110 also contains an application service provider 112 to provide web and other application services to the mobile wireless device 101 and other network users. The system controller 110 may also include an access point management service 114 and a cellular location information service 115.

The system controller 110 also includes a data store 111 for storing information that the other services of the system controller 110 may use. The data store 111 may be implemented as a database store, a file store, memory store or any other type of data store. The implementation of the data store 111 is not limited. However the data store 111 is implemented the purpose of the data store 111 is to store data that the other services of the system controller 110 may access.

If the services of the system controller 110 are implemented using separate devices or on multiple devices the services may have separate data stores or may share a common data store.

The system controller 110 may also be connected via a network 121 to other networks 120, such as the internet.

The wireless network access points 102 will typically be distributed in a grid pattern in a physical location such as a store, a shopping mall or a campus. FIG. 2 shows a part of a store 200 with multiple wireless access points 102 distributed thought the store. The rectangle 202 represents aisles in the store and the room 203 may for example be a toilet facility or changing room.

When there are multiple wireless network access points 102 in a location, information providers such as Google™ can use information such as the known location of the access points and the signal strength received from the wireless network access points by the mobile wireless device to calculate the location of the mobile device. Typically the Received Signal Strength Indication (RSSI) provided by the receiver is used in these calculations.

Even if the information provider does not know the exact location of a wireless network access point it is possible for them over time to estimate the location of the wireless network access point based on information they have received from wireless mobile devices within the vicinity of the network access point.

Such information is valuable, if for example you know that mobile wireless device 101 in a location that indicates the user of the device is browsing the small appliances aisle 202 of a store the information provider can target the user with information on small appliances based possibly including special offers for small appliances.

One method information providers use to obtain information on where the user is located within a store is when users use their mobile devices to scan the barcode of a product. The information provider can also obtain from the mobile wireless device information on wireless access points 102 the mobile wireless device 101 has been in communication with around the time they scanned the barcode.

Information on the wireless network access points 102 would typically include the unique MAC address of the wireless access point and the signal strength of the received signal. Using this information from a number of users the information provider can with reasonable accuracy build a map of the products being offered within a location with a store. Such information is usually obtained via an application running on the user's device provided by the information provider.

In the present invention the wireless network is obfuscated so the information providers cannot easily use the information they receive to build a map.

Referring again to FIG. 1 the wireless network 100 is obfuscated by altering the characteristics of the wireless network access points 102 within the network. The signature of the wireless network access points 102 that is used to calculate the mobile devices location includes the MAC address and the signal strength of the wireless network access points 102. By changing the MAC address and the signal strength of the wireless network access points 102 over a period of time this can make the location of the wireless network access points 102 difficult to determine.

The access point management service 110 of the present invention periodically changes the MAC address and signal strength of the access points within the network. The MAC addresses would be reused so it would appear that the wireless access point with MAC address X is moving around the store 200. The access point management service 110 may also periodically change the antenna each wireless access point 102 uses to transmit and receive on. The antenna used can only be changed on wireless network access points 102 that have multiple antenna connected and in the present invention it is envisaged that a wireless access point with multiple antennas would have antennas with differing beam patterns and/or differing antenna gains. By changing the beam pattern and/or antenna gain the signal strength in different locations would be altered, thus altering the signature of the wireless access point.

It is envisaged that the wireless network access points 102 used by the present invention are manageable such that the wireless MAC address, transmitted signal strength and the antenna used can all be set from a central server or device such as the AP management server 110 of the present invention.

With these changes occurring it would be difficult to be sure of the location of any wireless network access point at any time.

To ensure the present invention can access accurate information on the wireless network access points 102 the AP management service 110 stores information on each wireless network access point 102 of the network in the data store 111. The stored information including the time that the information was correct, the physical location of the access point, and information on the MAC address, signal strength and antenna in use for the time period. The stored information being accurate only for the time period the wireless access point was using the particular setting. The stored information may additionally include information on the antenna beam patterns of the various antennas used within the wireless network 100.

Referring again to FIG. 1, a mobile wireless device 101 within the network communicates with a number of wireless network access points 102 and for each wireless network access point 102 the mobile wireless device 101 it communicates with it stores the time of communication, the wireless access point MAC address and the signal strength of the received signal. Usually the mobile wireless device stores the Received Signal Strength Indication. The time of the communication is usually also the time provided by the wireless network access point 102 within the communication.

In a Wi-Fi network the mobile wireless device 101 would regularly receive a beacon transmission from wireless network access points 102 within range of the mobile wireless device 101. The mobile wireless device 101 will receive these communications even though the mobile wireless device 101 need not send a communication back.

In one embodiment an application implementing the present invention will run on the mobile wireless device 101. The application on the mobile wireless device 101 obtains information from the operating system of the mobile wireless device 101, relating to communications the mobile wireless device 101 has with wireless network access points 102. The application may store such information for later use or only request the information when needed.

The application on the mobile wireless device 101 when it wants to know the location of the mobile wireless device 101, sends a request to the location service 113. Information included with the request includes for each wireless network access point 102 the mobile wireless device 101 has been in communication with the MAC address of the wireless network access point 102 and the time of the communication. Optionally the application may send information on the signal strength received by the mobile wireless device 101.

Upon receiving the request the location service 113 for each time and MAC address pair looks up the information in the data store 111 and responds to the request by providing the location of the wireless access point 102 and optionally the transmitted signal strength for the time of the communication.

Using the received information the application on the mobile wireless device 101 then calculate the location of the mobile wireless device 101 using trilateration or other methods based on the received signal strengths and the location of the wireless access points. Optionally the transmitted signal strength may also be used in the calculation of the location.

In an alternative embodiment when the application on the mobile wireless device 101 wants to know the location of the mobile wireless device 101, the application sends a request to the location service 113 for the location. Information included with the request may include information on the mobile wireless device such as the mobile wireless device type. Alternatively information on the mobile wireless device type may not be sent as the location service 113 either accesses that information from information on the mobile wireless device 101 previously stored in the data store 111 or obtains the information from a third party based on the MAC address of the mobile wireless device 101.

In one embodiment the information provided with the request would also include for each wireless network access point 102 the mobile wireless device 101 has been in communication with the MAC address of the wireless access point, the time of the communication and information on the signal strength received.

Based on the information received from the mobile wireless device 101, information from the data store 11 and information on the mobile wireless device 101 the location service 113 calculates the location of the mobile wireless device 101 using trilateration or other methods. Optionally the transmitted signal strength may also be used in the calculation of the location.

The calculated location data is then sent to the mobile wireless device 101.

Figure 3:
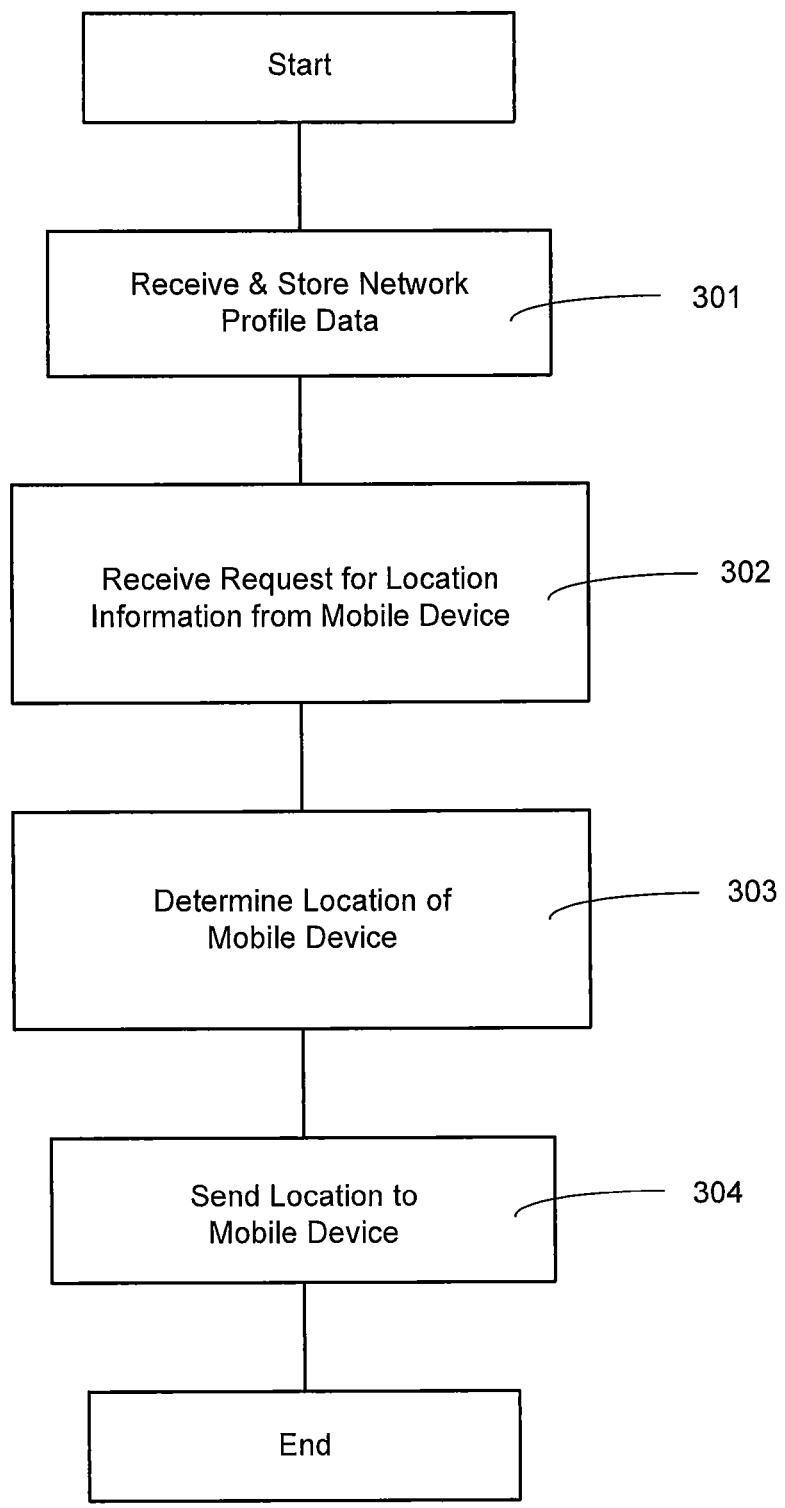
FIG. 3 shows a flow chart of the location determination steps of one embodiment of the present invention.

Referring to FIG. 3 the information flow to and from the system controller 110 in one embodiment of the invention is illustrated. The system controller 110 stores 301 network profile data on wireless network access points 102 within the system. It receives 302 a request for location information from a mobile wireless device 101 and in response to the request determines 303 the location of the wireless mobile device 101. Once it has determined the location of the mobile wireless device it sends 304 the location to the mobile wireless device 101.

Figure 4:
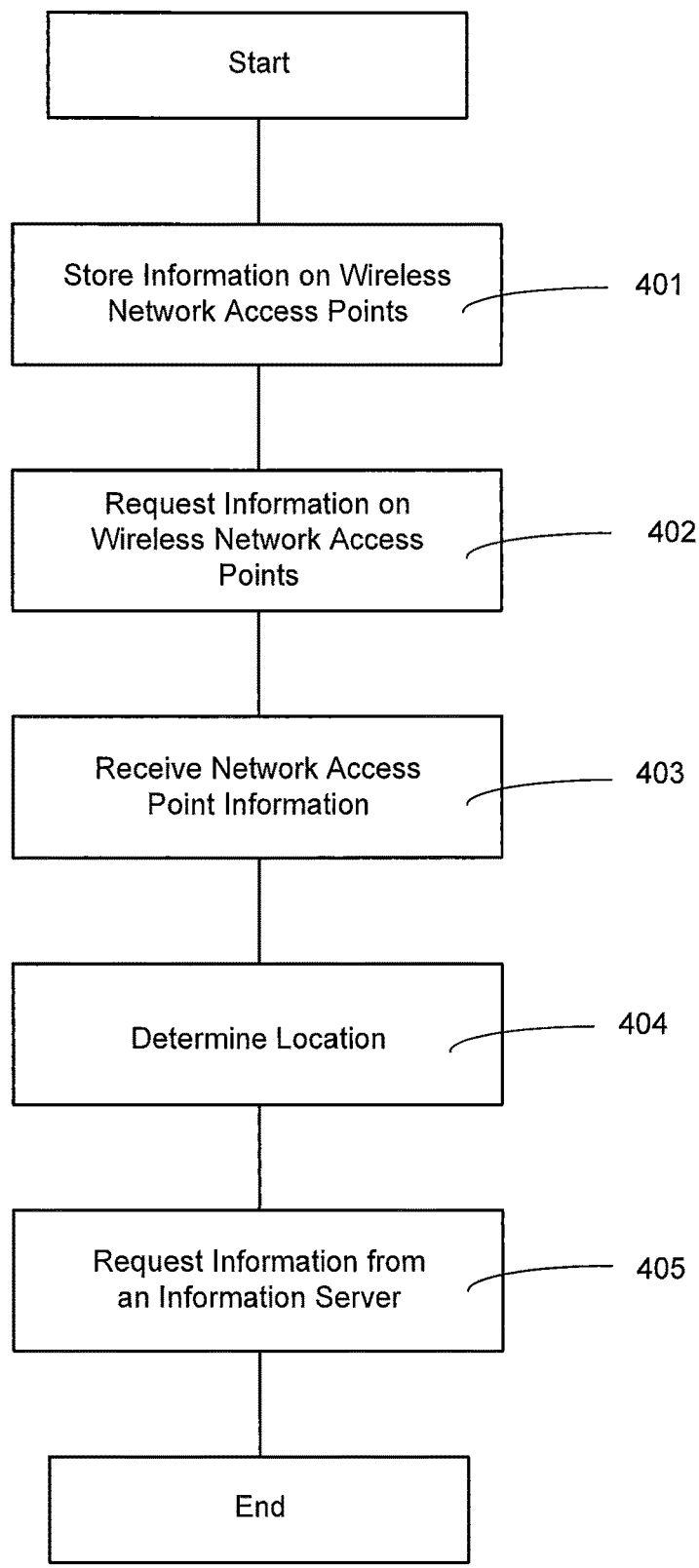
FIG. 4 shows a flow chart of the location determination steps of a further embodiment of the present invention.

The information flow to and from a mobile wireless device 101 is illustrated in FIG. 4. The mobile wireless device 101 stores 401 information on the wireless network access points 102 that it has communicated with. When the mobile wireless device 101 wishes to determine its location it sends a request 402 for network location information on the wireless network access points it has been in communication with. Once it has received 403 the information the mobile wireless device 101 determines its location 404. Optionally the mobile wireless device 101 may request information 405 from an information server, the information requested being based on the location of mobile wireless device 101. In an alternative embodiment the mobile wireless device 101 instead of requesting network location information on the wireless network access points 102, the mobile wireless device 101 may directly request its location.

It is envisaged that once the application residing on the mobile wireless device 101 knows it physical location application could request information based on that location from the application and web service 112. Such information could include a floor plan of the store so that the user could be presented with the floor plan showing their location. Also envisaged is that the application would be able to provide directions to the user to products the users selects from a search. In order to do that the application would in one embodiment obtain the location of the product from the application and web service 112 and then calculate the path to the product from the user's current location. In another embodiment the application would sent the users current location and the product they wish to purchase to the application and web service 112, which would then calculate the path to the product and send the path back to the application running on the mobile wireless device 101, which would display the path on a floor plan for the user to follow.

The provision of other location based services such as directs to toilets 203 or changing rooms are also envisaged. While not intended to be limiting other services could include displaying the location and the path to another user associated with the user of the mobile wireless device 101.

The wireless network of the present invention is in one embodiment a Wi-Fi standard (802.11) network. But the present invention may be used with any similar wireless LAN network protocol or the Bluetooth protocol for example with a beacon. If used with beacon technology then instead of changing the access point MAC address, the access point transmit antenna and the access point transmit signal strength the beacon identifiers would be changed.

The identifiers of a beacon that would be changed include beacon proximity UUID, beacon Proximity Major, beacon proximity minor, beacon power and beacon transmit frequency.

In a further embodiment to prevent location information leakage the physical location may have cellular coverage via micro cellular sites hosted within the environment and the cellular location information service 115 controls access to information on the location of the mobile devices that also have cellular access such that information providers only receive generalised information on the device location. Emergency services would be able to receive accurate information as needed on the location of the cellular device.

The wireless network may include a combination of Wi Fi standard (802.11) network devices, beacon Bluetooth devices and micro cellular transmitter devices.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

What we claim is:

1. An apparatus for providing location information within a wireless network, the wireless network having a plurality of wireless network access points, the wireless network operable to obfuscate location information, wherein the wireless network obfuscates location information by periodically altering the network profile of one or more wireless network access points the apparatus comprising a processor and memory coupled to the processor capable of storing data, wherein the processor is configured to:
   store network profile data about each of the wireless network access points within the network, the network profile data including:
      an identifier for the network access point;
      signal information;
      physical location of the network access point; and
      time or times that the network profile data was correct;
   receive a request for location information from a client application executing on a mobile wireless device, the request data including:
      information about the wireless network access points the mobile wireless device has been in communication with;
      information about the received signal; and
      time of the communication;
   determine the location of the mobile wireless device using the request data and the network profile data; and
   send the location to the client application,
wherein one or more of the network access points is a beacon and wherein the network profile is altered by changing one or more characteristics of the beacon, the changed characteristics being selected from the group consisting of beacon proximity UUID, beacon proximity major, beacon proximity minor, beacon power and beacon transmit frequency.

2. The apparatus for providing location information within a wireless network as claimed in claim 1 wherein one or more of the network access points is a Wi-Fi network access point and wherein the network profile is altered by changing one or more characteristics of the Wi-Fi network access point, the changed characteristic being selected from the group consisting of the access point MAC address, the access point transmit antenna and the access point transmit signal strength.

3. The apparatus for providing location information within a wireless network as claimed in claim 1 wherein the apparatus additionally uses information from a cellular location information server when determining the location of the mobile device.

4. A method executable on an electronic computing device for providing location information about the physical location of a mobile wireless device within a wireless network, the wireless network having a plurality of wireless network access points, the wireless network operable to obfuscate location information, wherein the wireless network obfuscates location information by periodically altering the network profile of one or more wireless network access points, the method comprising:
   storing by the electronic computing device network profile data about a plurality of wireless network access points within the network, the network profile data including:
      an identifier for the network access point;
      signal information;
      physical location of the network access point; and
      time or times that the network profile data was correct;
   receiving on an electronic computing device a request for location information from a client application executing on a mobile device, the request including:
      information about wireless network access points the mobile wireless device has been in communication with;
      information about the received signal; and
      time of the communication;
   determining by electronic computing device the location of the mobile wireless device using the request data and the network profile data; and
   sending by electronic computing device the location to the client application, wherein one or more of the network access points is a beacon and wherein the network profile is altered by changing one or more characteristics of the beacon, the changed characteristics being selected from the group consisting of beacon proximity UUID, beacon proximity major, beacon proximity minor, beacon power and beacon transmit frequency.

5. The apparatus for providing location information within a wireless network as claimed in claim 2 wherein the apparatus additionally uses information from a cellular location information server when determining the location of the mobile device.

6. The method for providing location information about the physical location of a mobile wireless device within a wireless network as claimed in claim 4 wherein one or more of the network access points is a Wi-Fi network access point, and wherein the network profile is altered by changing one or more characteristics of the access point, the changed characteristic being selected from the group consisting of the access point MAC address, the access point transmit antenna and the access point transmit signal strength.

7. The method for providing location information about the physical location of a mobile wireless device within a wireless network as claimed in claim 4 wherein the apparatus additionally uses information from a cellular location information server when determining the location of the mobile device.

8. The method for providing location information about the physical location of a mobile wireless device within a wireless network as claimed in claim 6 wherein the apparatus additionally uses information from a cellular location information server when determining the location of the mobile device.

9. A mobile wireless device, comprising:
   a processor; and
   a memory coupled to the processor and capable of storing data,
wherein the processor is configured to:
   store network profile data about a plurality of wireless network access points within the network that the mobile wireless device has been in communication with, the network profile data for each wireless network access point including:
      an identifier for the network access point;
      signal profile information; and
      time or times the mobile wireless device was in communication with the network access point;
   request from a server, wireless network access point information, data provided with the request including;
      a mobile wireless device identifier; and
      for each wireless network access point information is requested on:
         an identifier for the network access point; and
         the time or times the mobile wireless device was in communication with the network access point;

receive from the server, wireless network access point information, the wireless network access point information including:
an identifier for the wireless network access point,
the time or times the mobile wireless device was in communication with the network access point; and
for each time, signal information and location information; and
determine the location of the mobile wireless device using the request data and the received wireless network access point information,
wherein one or more of the network access points is a beacon and wherein the network profile is altered by changing one or more characteristics of the beacon, the changed characteristics being selected from the group consisting of beacon proximity UUID, beacon proximity major, beacon proximity minor, beacon power and beacon transmit frequency.

10. The mobile wireless device, as claimed in claim 9 wherein one or more the wireless network access points are Wi-Fi network access points and wherein the network profile is altered by changing one or more characteristics of the access point, the changed characteristic being selected from the group consisting of access point MAC address, access point transmit antenna and access point transmit signal strength.

11. The mobile wireless device, as claimed in claim 10 wherein the mobile device is further configured to:
request information from an information service based on the determined location of the mobile device; and
receive information from the information service and display the information received.

12. The mobile device, as claimed in claim 11 wherein the request information is selected from the group comprising directions to the location of a product, directions to a locality and directions to the location of another mobile device.

13. The mobile wireless device, as claimed in claim 9 wherein the mobile device is further configured to:
request information from an information service based on the determined location of the mobile device; and
receive information from the information service and display the information received.

14. The mobile device, as claimed in claim 13 wherein the request information is selected from the group comprising directions to the location of a product, directions to a locality and directions to the location of another mobile device.

15. A method of calculating the location of a mobile wireless device within a wireless network, the wireless network operable to obfuscate location information, the method comprising:
storing network profile data about a plurality of wireless network access points within the network that the mobile wireless device has been in communication with, the network profile data for each wireless network access point including:
an identifier for the network access point;
signal profile information; and
the time the mobile wireless device was in communication with the network access point;
requesting from a server, wireless network access point information, data provided with the request including;
a mobile wireless device identifier; and
for each wireless network access point information is requested on:
an identifier for the network access point; and
the time or times the mobile wireless device was in communication with the network access point;
receiving from the server wireless network access point information, the wireless network access point information including:
an identifier for the network access point,
the time or times the mobile wireless device was in communication with the network access point; and
for each time, signal information and location information; and
determining the location of the mobile wireless device using the request data and the received wireless network access point information,
wherein one or more of the network access points is a beacon and wherein the network profile is altered by changing one or more characteristics of the beacon, the changed characteristics being selected from the group consisting of beacon proximity UUID, beacon proximity major, beacon proximity minor, beacon power and beacon transmit frequency.

16. The method of calculating the location of a mobile wireless device within a wireless network as claimed in claim 15 wherein one or more of the wireless network access points is a Wi-Fi network access point and wherein the network profile is altered by changing one or more characteristics of the access point, the changed characteristic being selected from the group consisting of access point MAC address, access point transmit antenna and access point transmit signal strength.

17. The method of calculating the location of a mobile wireless device within a wireless network as claimed in claim 15 the method further comprising:
requesting information from an information service based on the determined location of the mobile device; and
receiving information from the information service and displaying the information received.

18. The method of calculating the location of a mobile wireless device within a wireless network as claimed in claim 17 wherein the request information is selected from the group comprising directions to the location of a product, directions to a locality and directions to the location of another mobile device.

19. The method of calculating the location of a mobile wireless device within a wireless network as claimed in claim 16 the method further comprising:
requesting information from an information service based on the determined location of the mobile device; and
receiving information from the information service and displaying the information received.

20. The method of calculating the location of a mobile wireless device within a wireless network as claimed in claim 19 wherein the request information is selected from the group comprising directions to the location of a product, directions to a locality and directions to the location of another mobile device.

* * * * *